(12) United States Patent
Parri et al.

(10) Patent No.: US 6,491,990 B1
(45) Date of Patent: Dec. 10, 2002

(54) MONOREACTIVE MESOGENIC COMPOUNDS

(75) Inventors: Owain Llyr Parri, Dorset (GB); Ian Victor Edward Hassall, Dorset (GB); Tara Louise Cutler, Dorset (GB)

(73) Assignee: Merck Patent Gesellschaft mit beschraenkter Haftung, Darmstadt (DE)

( * ) Notice: Subject to any disclaimer, the term of this patent is extended or adjusted under 35 U.S.C. 154(b) by 142 days.

(21) Appl. No.: 09/609,381

(22) Filed: Jul. 3, 2000

(30) Foreign Application Priority Data

Jul. 2, 1999 (EP) .............................. 99112807

(51) Int. Cl.[7] ........................ C09K 19/20; C09K 19/38; G02F 1/13; C07C 69/76; C07C 25/24; C08G 63/54

(52) U.S. Cl. ....................... 428/1.1; 428/1.53; 428/1.55; 252/299.64; 560/76; 560/83; 570/129; 528/192

(58) Field of Search ................ 252/299.64, 299.65; 428/1.1, 1.53, 1.55; 560/76, 83; 570/129; 528/192

(56) References Cited

U.S. PATENT DOCUMENTS 5,602,661 A * 2/1997 Schadt et al. ............... 349/124

5,833,880 A * 11/1998 Siemensmeyer et al. ..................... 252/299.64

FOREIGN PATENT DOCUMENTS

| DE | 3837936 A1 | 9/1988 |
| EP | 648827 A1 | 1/1994 |
| WO | 97/34862 * | 9/1997 |

OTHER PUBLICATIONS

English Abstract, Patent No. DE3837936, 1990.

* cited by examiner

*Primary Examiner*—Shean C. Wu
(74) *Attorney, Agent, or Firm*—Millen, White, Zelano & Branigan, P.C.

(57) ABSTRACT

The invention relates to monoreactive mesogenic compounds of formula I

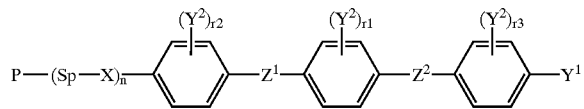

wherein P, Sp, X, n, $Y^1$, $Y^2$, r1, r2, r3, $Z^1$ and $Z^2$ are defined herein.

20 Claims, No Drawings

MONOREACTIVE MESOGENIC COMPOUNDS

The invention relates to monoreactive mesogenic compounds, to polymerizable liquid crystal compositions comprising the monoreactive mesogenic compounds, to linear or crosslinked liquid crystal polymers obtainable from the monoreactive mesogenic compounds and the polymerizable compositions comprising them, and to the use of the monoreactive mesogenic compounds and the polymerizable compositions and polymers obtainable thereof in optical elements, liquid crystal displays, adhesives, synthetic resins with anisotropic mechanical properties, cosmetics, diagnostics, liquid crystal pigments, decorative and security applications, nonlinear optics and optical information storage:

BACKGROUND OF THE INVENTION

Polymerizable mesogenic compounds, which are also known as reactive mesogenic compounds, have been described in prior art for various purposes. For example, they can be aligned in their liquid crystal phase and subsequently polymerized in situ, to give linear or crosslinked liquid crystal polymer films with uniform orientation of high quality. These films can be used for example as optical elements, like polarization filters as described in EP 0 397 263, broadband circular polarizers as described in EP 0 606 940 and WO 97/35219, or compensation or retardation films as described in WO 98/00475, WO 98/04651 and WO 98/12584.

The polymerizable mesogenic compounds described in prior art, however, do often exhibit liquid crystalline phases only in a small temperature range or do not show mesophase behavior at all.

Therefore, often mixtures of two or more polymerizable compounds are used for the preparation of oriented liquid crystal polymer films.

When preparing oriented liquid crystal polymer films for the uses as described above, it is especially desired to have available polymerizable compositions exhibiting a nematic liquid crystal phase at room temperature, so that it is possible to carry out aligment and polymerization of the composition at low temparatures. For this purpose, it is advantageous if the single polymerizable components exhibit broad liquid crystalline phases, too.

Thus, there is a demand for polymerizable mesogenic compounds with a broad liquid crystalline phase, which can be used for the preparation of oriented liquid crystal polymer films for optical applications.

Furthermore, regarding the broad range of applications for polymerizable mesogenic compounds it is desirable for the expert to have available further compounds of this type which are easy to synthesize and fulfill the various requirements as described above.

SUMMARY OF THE INVENTION

It was an aim of the invention to provide polymerizable mesogenic compounds with advantageous properties, thus extending the pool of reactive mesogenic compounds available to the expert. Other aims of the present invention are immediately evident to the person skilled in the art from the following detailed description.

It was now found that these aims can be achieved by providing monoreactive mesogenic compounds according to the present invention.

The terms reactive or polymerizable mesogenic compound as used in the foregoing and the following comprise compounds with a rod-shaped, board-shaped or disk-shaped mesogenic group, i.e. a group with the ability to induce mesophase behavior. These compounds do not necessarily have to exhibit mesophase behavior by themselves. It is also possible that these compounds show mesophase: behavior only in mixtures with other compounds or when the polymerizable mesogenic compounds or the mixtures comprising them are polymerized.

The compounds according to the present invention are characterized by a mesogenic core which comprises three phenylene rings linked via ester groups, and which is laterally monosubstituted and terminally substituted by polar groups.

Monoreactive mesogenic compounds having a mesogenic core that is substituted with polar groups are disclosed in DE 38 37 936 and EP 0 648 827.

DE 38 37 936 shows monoreactive methacrylates with a mesogenic core that consists of a hydroquinone dibenzoate being laterally substituted with alkyl or alkoxy groups having two or more C atoms and carries a terminal cyano or alkoxy group. However, monoreactive compounds according to the present invention are not disclosed in DE 38 37 936. Furthermore, the compounds shown in DE 38 37 936 do exhibit only narrow or even monotropic nematic phases.

EP 0 648 827 discloses mono- and direactive mesogenic compounds having a mesogenic core with three phenylene rings linked directly or via ester groups, and optionally being laterally substituted with polar groups. However, the monoreactive ester compounds of the present invention are not disclosed in EP 0 648 827, whereas e.g. the compounds of EP 0 648 827 with directly linked phenylene groups (terphenyls) show a tendency to smectic phase behavior.

A particularly preferred aspect of the invention relates to the use of the inventive monoreactive mesogenic compounds in polymerizable compositions for the preparation of a liquid crystalline polymer retardation or compensation film with a planar or tilted structure.

In this connection, the term 'tilted structure' means that the optical axis of the retardation film forms a tilt angle between 0 and 90° with the plane of the film. The term 'planar structure' means that the optical axis of the retardation film is oriented substantially parallel to the plane of the film. For sake of simplicity, an optical retardation film (ORF) with a tilted structure or a planar structure is hereinafter shortly referred to as 'tilted ORF', and 'planar ORF', respectively.

A tilted ORF is described for example in WO 98/12584, a planar ORF is described for example in WO 98/04651, the entire disclosure of these documents being incorporated into this application by way of reference.

Planar and tilted ORFs as described above are usually prepared from a polymerizable liquid crystal composition by coating a thin layer of the composition onto a substrate, aligning the liquid crystal molecules in the layer in the desired orientation, and fixing the orientation by polymerization.

Thus, in case of a planar ORF, it is required to achieve highly uniform alignment of the polymerizable compounds, with the mesogenic groups oriented substantially parallel to the substrate, i.e. with a low tilt angle or preferably without any tilt, whereas in case of a tilted ORF, the polymerizable compounds have to be aligned such that the mesogenic groups form the desired tilt angle with the plane of the substrate.

The inventors have found that, when using a monoreactive prior art mesogenic compound with a polar terminal group in a polymerizable composition, such as e.g. the compound

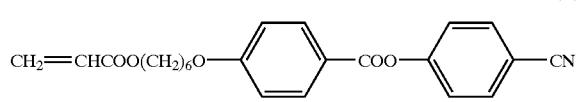
(A)

the methacrylate homologue of which is described in EP 0 445 629, the resulting composition has a relatively narrow nematic phase with a low nematic isotropic phase transition temperature (clearing temperature), and shows a relatively low tilt angle.

On the other hand, when adding a monoreactive prior art compound with an non-polar terminal alkyl group to the polymerizable composition, such as e.g. the compound

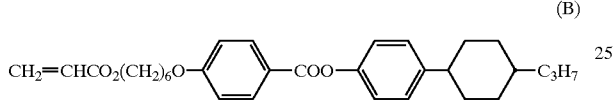
(B)

which is known from WO 97/34862 and exhibits a broad nematic phase, the clearing temperature of the composition is increased, however at the same time the tilt angle is increased.

Therefore, due to the above described arbitrating effects it is difficult, by using known compounds, to increase the clearing temperature of a polymerizable composition without altering the tilt angle.

The inventors now found that, when using one or more monoreactive mesogenic compounds according to the present invention in a polymerizable liquid crystal composition as described above, it is possible at the same time to increase the clearing point of the composition whereas the tilt angle remains substantially the same.

Thus, the inventive monoreactive mesogenic compounds can be used in a polymerizable liquid crystal composition that shows planar orientation with low tilt when coated onto a substrate, in order to improve the nematic phase behavior of the composition. On the other hand, the inventive compounds can also be used in a polymerizable liquid crystal composition that shows a tilted orientation when coated onto a substrate, in order to increase the clearing point without negatively affecting the tilt angle. The advantageous effects of the inventive compounds will be further demonstrated in the examples below.

One object of the present invention are monoreactive mesogenic compounds of formula I

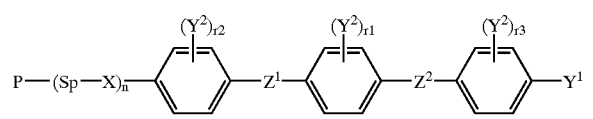
I wherein

P is $CH_2=CW-COO-$, $WCH=CH-O-$,

or $CH_2=CH-$ Phenyl-$(O)_k-$ with W being H, $CH_3$ or Cl and k being 0 or 1,

Sp is a spacer group having 1 to 20 C atoms,

X is $-O-$, $-S-$, $-CO-$, $-COO-$, $-OCO-$, $-CO-NH-$, $-NH-CO-$, $-CH_2CH_2-$, $-OCH_2-$, $-CH_2O-$, $-SCH_2-$, $-CH_2S-$, $-CH=CH-$, $-CH=CH-COO-$, $-OCO-CH=CH-$, $-C\equiv C-$, or a single bond, n is 0 or 1, $Y^1$ and $Y^2$ are each independently F, Cl, CN, OH, $NO_2$, $OCH_3$, $COR^1$, $COOR^1$ or a fluorinated alkyl or alkoxy group having 1 to 4 C atoms, $R^1$ is an alkyl group with 1 to 3 C atoms, which is optionally fluorinated, r1, r2 and r3 are 0 or 1, with r1+r2+r3=1, $Z^1$, $Z^2$ are each independently $-COO-$ or $-OCO-$.

Another object of the invention is a polymerizable liquid crystal composition comprising at least two polymerizable compounds, at least one of which is a compound of formula I.

Another object of the invention is a linear or crosslinked polymer obtainable by polymerization of one or more compounds of formula I or of a polymerizable composition comprising one or more compounds of formula I.

Yet another object of the invention is the use of a compound of formula I, or a polymerizable composition or polymer obtainable thereof, in optical elements such as polarizers, optical retardation or compensation films, alignment layers, color filters or holographic elements, in liquid crystal displays such as PDLC, polymer gel or polymer stabilized cholesteric texture (PSCT) displays, in adhesives, synthetic resins with anisotropic mechanical properties, cosmetics, diagnostics or liquid crystal pigments, for decorative and security applications, and for nonlinear optics or optical information storage.

Formula I covers the following subformulae

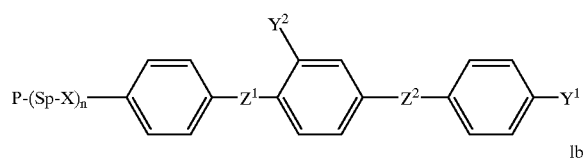
Ia

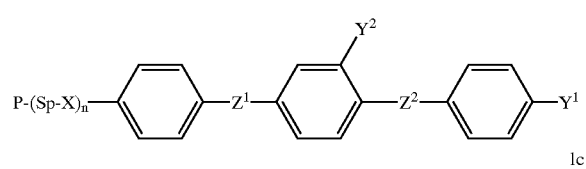
Ib

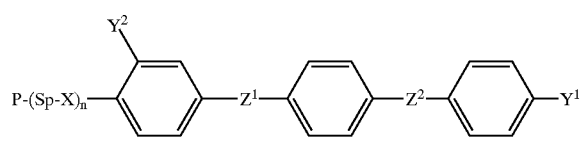
Ic

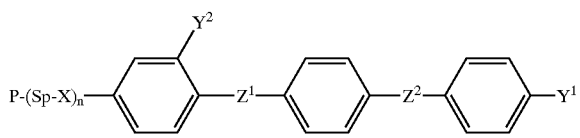

Id

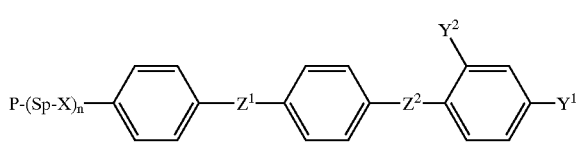

Ie

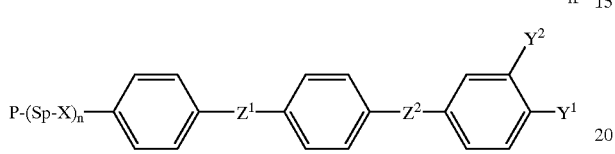

If wherein P, Sp, X, n, $Y^1$, $Y^2$, $Z^1$ and $Z^2$ have the meaning of formula I.

Particularly preferred are compounds of subformulae Ia, Ic, Ie and If.

Further preferred are monoreactive compounds of formula I, wherein n is 1 and Sp is alkylene with 1 to 15 C atoms.

P is an acryl, methacryl or epoxy group.

$Y^1$ and $Y^2$ are selected from F, Cl, OH, $OCH_3$, $COCH_3$, $COC_2H_5$, $COOCH_3$, $COOC_2H_5$, $CF_3$, $OCF_3$, $OCHF_2$ and $OC_2F5$.

P in formula I and its subformulae is preferably an acrylate group, a methacrylate group, a vinyl or vinyloxy group, an epoxy group, a styrene group or a propenyl ether group, in particular an acrylate, methacrylate, vinyloxy or epoxy group, very preferably an acrylate or epoxy group.

Particularly preferred are compounds of formula I wherein n is I.

As for the spacer group Sp in formula I and its subformulae, all groups can be used that are known for this purpose to the skilled in the art. The spacer group Sp is preferably a linear or branched alkylene group having 1 to 20 C atoms, in particular 1 to 12 C atoms, in which, in addition, one or more non-adjacent $CH_2$ groups may be replaced by —O—, —S—, —NH—, —N($CH_3$)—, —CO—, —O—CO—, —S—CO—, —O—COO—, —CO—S—, —CO—O—, —CH(halogen)— or —CH(CN)—.

Typical spacer groups are for example —$(CH_2)_o$—, —$(CH_2CH_2O)_p$—$CH_2CH_2$—, —$CH_2CH_2$—S—$CH_2CH_2$— or —$CH_2CH_2$—NH—$CH_2CH_2$—, with o being an integer from 2 to 12 and p being an integer from 1 to 3.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene for example.

Especially preferred are inventive compounds of formula I and its subformulae wherein Sp is denoting an alkyl or alkoxy group with 2 to 8 C atoms. Straight-chain alkyl or alkoxy groups are especially preferred.

In another preferred embodiment of the invention the chiral compounds of formula I comprise at least one spacer group Sp that is a chiral group of the formula II:

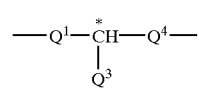

II wherein $Q^1$ is an alkylene or alkylene-oxy group with 1 to 8 C atoms or a single bond, $Q^3$ is halogen, a cyano group or an alkyl or alkoxy group with 1 to 4 C atoms different from $Q^1$, and $Q^4$ is an alkylene or alkyleneoxy group with 1 to 7 C atoms or a single bond, and is different from $Q^1$.

In case $Q^4$ in formula II is an alkylene-oxy group, the O atom is preferably adjacent to the chiral C atom.

X in formula I and its subformulae is preferably —O—, —CO—, —COO—, —OCO— or a single bond, in particular —O— or a single bond.

$Y^1$ and $Y^2$ in formula I and its subformulae preferably denote, independently of each other, F, Cl, CN, $NO_2$, OH, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$ or $OC_2F_5$, in particular F, Cl, $OCH_3$ or $OCF_3$, most preferably Cl or $OCH_3$.

The inventive compounds of formula I can be synthesized according to or in analogy to methods which are known per se and which are described in standard works of organic chemistry such as, for example, Houben-Weyl, Methoden der organischen Chemie, Thieme-Verlag, Stuttgart. Some specific methods of preparation can be taken from the examples.

The invention also relates to a polymerizable liquid crystal composition comprising at least two polymerizable components, at least one which is a compound of formula I, and to linear or crosslinked polymers prepared from the inventive compounds and compositions.

Suitable polymerizable mesogenic compounds that can be used as co-components of the polymerizable liquid crystal composition, together with the inventive compounds of formula I, are disclosed for example in WO 93/22397; EP 0,261,712; DE 195,04,224; WO 95/22586 and WO 97/00600. The compounds disclosed in these documents, however, are to be regarded merely as examples that shall not limit the scope of this invention.

Typical examples representing such polymerizable mesogenic compounds are shown in the following list of compounds, which should, however, be taken only as illustrative and is in no way intended to restrict, but instead to explain the present invention:

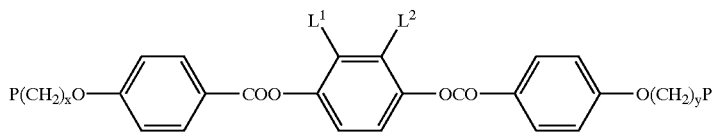

(V1)

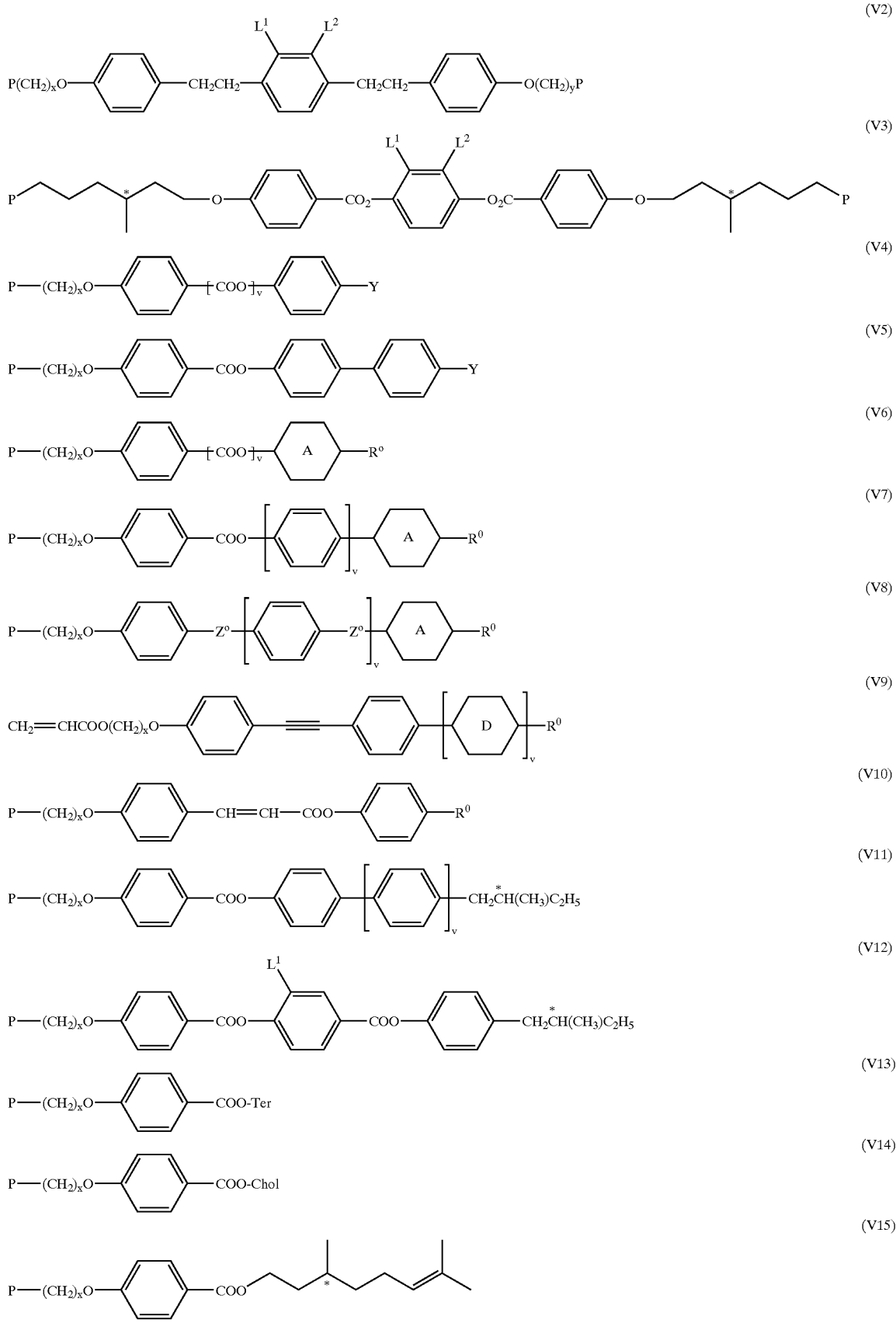

In the above formulae, P has one of the meanings of formula I and its preferred meanings as mentioned above, x and y are each independently 1 to 12, A is 1,4-phenylene or 1,4-cyclohexylene, v is 0 or 1, $Z^0$ is —COO—, —OCO—, —CH$_2$CH$_2$— or a single bond, Y is a polar group, $R^0$ is a non-polar alkyl or alkoxy group, Ter is a terpenoid radical like e.g. menthyl, Chol is a cholesteryl group, and $L^1$ and $L^2$ are each independently H, F, Cl, CN or an optionally halogenated alkyl, alkoxy or carbonyl group with 1 to 7 C atoms.

In a preferred embodiment of the invention the polymerizable liquid crystalline composition comprises at least one monoreactive compound of formula I and at least one di- or multireactive polymerizable compound, i.e. a mesogenic compound having two or more polymerizable groups. Especially preferred are direactive compounds, i.e. compounds comprising two polymerizable groups. Very preferred are direactive compounds of formulae V1, V2 and V3 above.

It is also possible for the inventive polymerizable liquid crystalline composition to comprise one or more non-polymerizable chiral compounds, which may be mesogenic or non-mesogenic, in addition or alternatively to chiral polymerizable compounds. For example, commercially available dopants, like e.g. R 811 or R 1011 (from Merck KGaA, Germany) can be used for this purpose.

Polymerizable liquid crystalline compositions are preferred that comprise 1 to 6, preferably 1 to 3 compounds of formula I.

In a preferred embodiment of the present invention the polymerizable liquid crystalline composition comprises 1 to 80% by weight, preferably 2 to 60%, in particular 5 to 50% by weight of one or more compounds of formula I.

In the polymerizable compositions comprising direactive mesogenic compounds, the total concentration of these compounds is preferably 1 to 50%, in particular 1 to 25%, very preferably 2 to 10% by weight of the total mixture. Especially preferably the polymerizable composition contains not more than 6% by weight of direactive mesogenic compounds.

Particularly preferred are polymerizable compositions comprising a1) 5 to 70%, very preferably 10 to 50% by weight of up to five, preferably one, two or three monoreactive mesogenic compounds of formula I, a2) 5 to 60%, very preferably 10 to 40% by weight of up to five, preferably one, two or three monoreactive mesogenic compounds having a non-polar terminal alkyl or alkoxy group, a3) 5 to 40%, very preferably 5 to 30% by weight of one, two or three monoreactive polymerizable mesogenic compounds having a polar terminal group, b) 0 to 25%, very preferably 1 to 10% by weight of a direactive polymerizable mesogenic compound, c) 0.5 to 10%, very preferably 1 to 7% by weight of a polymerization initiator, d) 0 to 5%, very preferably 0.1 to 2% by weight of a surfactant.

The compounds of component a2) are preferably selected from the above formulae V6 to V15, in particular from formulae V6 to V10.

The compounds of component a3) are preferably selected from the above formulae V4 and V5.

The compounds of component b) are preferably selected from the above formula V1 and V2.

The term polar group as used in the foregoing and the following means a group selected from halogen, CN, NO$_2$, OH, OCH$_3$, OCN, SCN, an optionally fluorinated carbonyl or carboxyl group with up to 4 C atoms or a mono- oligo- or polyfluorinated alkyl or alkoxy group with 1 to 4 C atoms. Especially preferred polar groups are those as defined for $Y^1$ in formula I, including its preferred meanings.

The term non-polar group means an alkyl group with 1 or more, preferably 1 to 12 C atoms or an alkoxy group with 2 or more, preferably 2 to 12 C atoms.

In addition to the components mentioned above, the polymerizable composition may also comprise one or more other suitable components such as e.g. catalysts, stabilizers, chain-transfer agents, co-reacting monomers or surface-active compounds. In particular the addition of stabilizers is preferred in order to prevent undesired spontaneous polymerization of the polymerizable material e.g. during storage.

In a preferred embodiment of the present invention, one or more surfactants are added to the polymerizable composition in order to improve planar alignment, i.e. an orientation wherein the mesogens are aligned substantially parallel to the plane of the layer, with a low tilt angle or even with zero tilt.

Suitable surfactants are described for example in J. Cognard, Mol.Cryst.Liq.Cryst. 78, Supplement 1, 1–77 (1981). Particularly preferred are non-ionic surfactants, such as mixtures of non-ionic fluoroalkylalkoxylate surfactants selected from formula III and IV

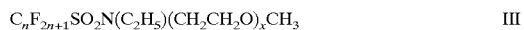

$C_nF_{2n+1}SO_2N(C_2H_5)(CH_2CH_2O)_xCH_3$     III $C_nF_{2n+1}(CH_2CH_2O)_xH$     IV wherein n is an integer from 4 to 12 and x is an integer from 5 to 15. Upon using these surfactants it is possible to produce polymerized films with a very low tilt angle.

The surfactants of formula III are commercially available under the trade name Fluorad 171 (from 3M Co.), the surfactants of formula IV under the trade name Zonyl FSN (from DuPont).

Polymerizable mesogenic compositions of this preferred embodiment contain preferably from 500 to 2500 ppm, in particular from 1000 to 2500 ppm, very preferably from 1500 to 2500 ppm of surfactants. Further preferred compositions contain 0.01 to 5%, in particular 0.1 to 3%, very preferably 0.2 to 2% by weight of surfactants.

It is also possible, in order to increase crosslinking of the polymers, to add up to 20% of a non-mesogenic compound with two or more polymerizable functional groups to the polymerizable composition alternatively or additionally to di- or multireactive mesogenic compounds.

Typical examples for difunctional non-mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

Liquid crystalline polymers can be obtained from the inventive polymerizable compounds and compositions e.g. by solution polymerization or by in-situ polymerization.

For example, solution polymerization can be carried out in a solvent like dichloromethane, tetrahydrofuran or toluene using AIBN as an initiator and heating for 24 hours at 30 to 60° C.

The in-situ polymerization of polymerizable liquid crystalline compounds and compositions is described in detail by D. J.Broer et al., Makromol.Chem. 190, 2255ff. and 3202ff. (1989).

The polymerizable liquid crystal compounds and compositions according to this invention are preferably polymerized in situ as described in the foregoing and the following.

The inventive compounds and polymerizable liquid crystalline compositions are particularly useful for the preparation of anisotropic polymer films, such as nematic or cholesteric polymer films, with uniform molecular orientation.

Thus, another object of the invention is an anisotropic polymer film with an oriented liquid crystalline phase that is obtainable by polymerizing a polymerizable liquid crystalline composition comprising at least one monoreactive polar mesogenic compound of formula I.

To prepare an anisotropic polymer film with uniform orientation, an inventive polymerizable mesogenic composition is preferably coated onto a substrate, aligned and polymerized in situ by exposing them to heat or actinic radiation. Alignment and curing are preferably carried out in the liquid crystalline phase of the composition.

Actinic radiation means irradiation with light, like UV light, IR light or visible light, irradiation with X-rays or gamma rays or irradiation with high energy particles, such as ions or electrons. As a source for actinic radiation for example a single UV lamp or a set of UV lamps can be used. Another possible source for actinic radiation is a laser, like e.g. a UV laser, an IR laser or a visible laser.

When polymerizing by means of UV light, for example a photoinitiator can be used that decomposes under UV irradiation to produce free radicals or ions that start the polymerization reaction.

It is also possible to use a cationic photoinitiator, when curing reactive mesogens with for example vinyl and epoxide reactive groups, that photocures with cations instead of free radicals.

As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

Preferably the polymerizable liquid crystalline composition comprises 0.01 to 10%, in particular 0.05 to 8%, very preferably 0.1 to 6% by weight of a photoinitiator, especially preferably a UV-photoinitiator.

In a preferred embodiment of the invention the polymerization of the polymerizable composition is carried out under an atmosphere of inert gas, preferably under a nitrogen atmosphere.

As a substrate for example a glass or quartz sheet as well as a plastic film or sheet can be used. It is also possible to put a second substrate on top of the coated mixture prior to, during and/or after polymerization. The substrates can be removed after polymerization or not. When using two substrates in case of curing by actinic radiation, at least one substrate has to be transmissive for the actinic radiation used for the polymerization.

Isotropic or birefringent substrates can be used. In case the substrate is not removed from the polymerized film after polymerization, preferably isotropic substrates are used.

Preferably at least one substrate is a plastic substrate such as for example a film of polyester such as polyethyleneterephthalate (PET), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from ICI Corp. under the trade name Melinex.

In a preferred embodiment of the present invention, the inventive polymerizable composition is coated as a thin layer on a substrate or between substrates and is aligned in its liquid crystal phase to give a uniform orientation.

A uniform orientation can be achieved for example by shearing the mixture, e.g. by means of a doctor blade. It is also possible to apply an alignment layer, for example a layer of rubbed polyimide or sputtered $SiO_x$, on top of at least one of the substrates. In some cases, the mixtures orient themselves spontaneously on the substrate, or good alignment is achieved already by the act of coating the mixture.

In another preferred embodiment, a second substrate is put on top of the coated material. In this case, the shearing caused by putting together the two substrates is sufficient to give good alignment.

It is also possible to apply an electric or magnetic field to align the coated mixture.

In some cases it is of advantage to apply a second substrate not only to aid alignment of the polymerizable mixture but also to exclude oxygen that may inhibit the polymerization. Alternatively the curing can be carried out under an atmosphere of inert gas. However, curing in air is also possible using suitable photoinitiators and high lamp power. When using a cationic photoinitiator oxygen exclusion most often is not needed, but water should be excluded.

For the preparation of anisotropic polymer gels, e.g. for use in switchable liquid crystal display devices, the polymerizable compounds or compositions can be polymerized in situ as described above, however, in this case alignment of the polymerizable mixture is not necessarily required, although it may be desired for specific applications.

The invention also relates to the use of inventive compounds, compositions and polymers such as polarizers, optical retardation or compensation films, alignment layers, colour filters or holographic elements, in liquid crystal displays such as PDLC, polymer gel or polymer stabilized cholesteric texture (PSCT) displays, in adhesives, synthetic resins with anisotropic mechanical properties, cosmetics, diagnostics or liquid crystal pigments, for decorative and security applications, and for nonlinear optics or optical information storage. Inventive compounds comprising a chiral spacer group can also be used as chiral dopants.

The inventive compounds of formula I are particularly suitable for the preparation of oriented liquid crystal polymer films that can be used as polarization or compensation films in liquid crystal displays, in particular for the preparation of tilted and planar optical retardation and compensation films.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure[s] of all applications, patents and publications, cited above [or below], and of corresponding European application No. 99112807.5, filed Jul. 2, 1999, is hereby incorporated by reference.

In the foregoing and in the following examples, unless otherwise indicated, all temperatures are set forth uncorrected in degrees Celsius and all parts and percentages are by weight.

The following abbreviations are used to illustrate the liquid crystalline phase behavior of the compounds: K=crystalline; N=nematic; S=smectic; Ch=cholesteric; I=isotropic. The numbers between the symbols indicate the phase transition temperatures in ° C.

EXAMPLE 1

The following compounds were prepared in analogy to the method as described in D. J.Broer et al., Makromol.Chem. 190, 3201–3215 (1989) and in WO 97/34862.

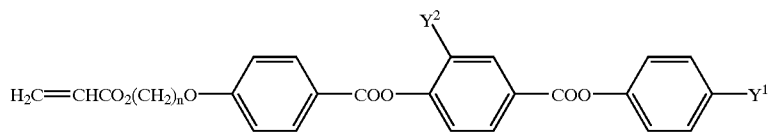

The LC phase behavior of the compounds is shown in table 1.

TABLE 1

LC phase behavior of inventive compounds

| No. | n | $Y^2$ | $Y^1$ | LC phase behaviour |
|---|---|---|---|---|
| 1 | 6 | Cl | $OCH_3$ | K 60.8 N 138.8 I |
| 2 | 3 | Cl | $OCH_3$ | K 101.6 N 159.3 I |
| 3 | 6 | Cl | Cl | K 78.3 N 126 I |
| 4 | 3 | Cl | Cl | K 112 N 137 I |
| 5 | 6 | $OCH_3$ | $OCH_3$ | K 96.4 N 104 I |
| 6 | 3 | $OCH_3$ | $OCH_3$ | K 101.5 N 115.5 I |
| 7 | 6 | $OCH_3$ | Cl | K 75.5 N 83 I |
| 8 | 3 | $OCH_3$ | Cl | K 130.9 N 133.3 I |

EXAMPLE 2—COMPARISON EXAMPLE

The following polymerizable mixture was formulated with prior art compounds

| | |
|---|---|
| compound (A) | 43.5% |
| compound (B) | 17.0% |
| compound (C) | 6.0% |
| compound (D) | 33.5% |
| Irgacure 907 | 4.0% |
| FC 171 | 0.5% |

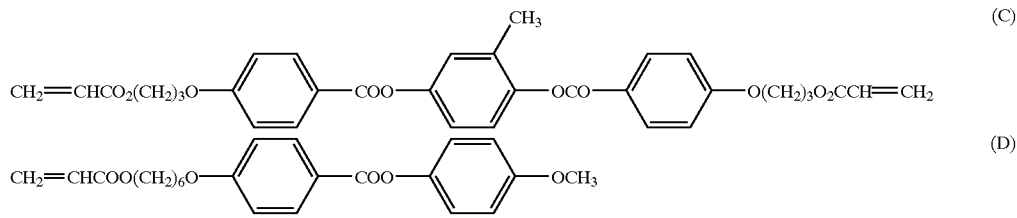

The compounds (A) to (D) can be prepared according to or in analogy to the methods described in D. J.Broer et al., Makromol. Chem. 190, 3201–3215 (1989) and in WO 97/34862. Irgacure 907 is a photoinitiator (commercially available from Ciba Geigy). FC 171 is a non-ionic fluorocarbon surfactant (available from 3M Corp.).

The polmyerizable mixture exhibits a nematic phase with a clearing temperature $T_{N-1}$ of 55.7° C.

EXAMPLE 3

In the polymerizable mixture of example 2, the monoreactive prior art compound (D) was replaced by an equal amount of the inventive monoreactive compound (1) of example 1.

The resulting mixture exhibits a nematic phase with a significantly higher clearing temperature $T_{N-1}$ of 81.1° C.

EXAMPLE 4

A number of polymerizable liquid crystal mixtures was formulated, each comprising a fixed amount of directive prior art compound (C), Irgacure 907, and FC 171, and comprising varying amounts of the monoreactive prior art compounds (A) and (D) and of the inventive monoreactive compound (1). All mixtures exhibit a nematic phase at room temperature.

A thin layer of each mixture was coated onto a substrate of TAC which had previously been rubbed by a velvet cloth, which causes the reactive mesogens to align in the direction of rubbing, and the average tilt angle was measured with a Thick Berek compensator fitted onto an Olympus BX50P polarizing microscope.

The average tilt angle $\theta_{ave}$ herein is defined as follows $$\theta_{ave} = \frac{\sum_{d'=0}^{d} \theta'(d')}{d}$$

wherein $\theta'(d')$ is the local tilt angle at the thickness d' within the layer, and d is the total thickness of the layer.

The composition, clearing point and average tilt angle of the polymerizable mixtures are depicted in table 2.

TABLE 2

Clearing Temperature and Tilt Angle of Inventive Polymerizable Mixtures

| | Mix. 1 | Mix. 2 | Mix. 3 |
|---|---|---|---|
| (C) (%) | 6 | 6 | 6 |
| (A) (%) | 42 | 32 | 40 |
| (D) (%) | 32 | 22 | 0 |
| (1) (%) | 20 | 40 | 54 |
| Irg 907 (%) | 4 | 4 | 4 |
| FC 171 (%) | 0.5 | 0.5 | 0.5 |
| $T_{N-1}$ (° C.) | 48.4 | 64.9 | 72.6 |
| Tilt (°) | 2.3 | 2.1 | 2.2 |

It can be seen that the clearing temperature of the mixtures increases significantly with increasing amount of the inventive compound (1), whereas the tilt angle remains substantially constant.

EXAMPLE 5—COMPARISON EXAMPLE

The following polymerizable mixture was formulated with prior art compounds

| | |
|---|---|
| compound (A) | 40.0% |
| compound (B) | 32.0% |
| compound (C) | 6.0% |
| compound (D) | 17.0% |
| Irgacure 907 | 5.0% |

The mixture exhibits a nematic phase at room temperature. with a clearing temperature $T_{N-1}$ of 70.0° C. When coated onto a substrate as described in example 4, the mixture exhibits a tilt angle of 37.8°.

EXAMPLE 6

In the polymerizable mixture of example 5, the monoreactive prior art compound (D) was replaced by an equal amount of the inventive monoreactive compound (1) of example 1.

The resulting mixture exhibits a nematic phase with a significantly higher clearing temperature $T_{N-1}$ of 83.5° C., and a tilt angle of 37.3°, which is substantially the same as in example 5.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A monoreactive mesogenic compound of formula I

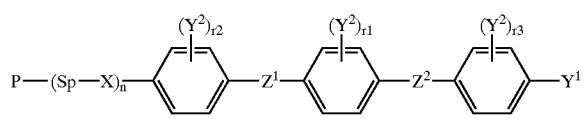

I wherein
P is CH$_2$=CW—COO—, WCH=CH—O—,

or CH$_2$=CH-Phenyl-(O)$_k$— with W being H, CH$_3$ or Cl and k being 0 or 1,

Sp is a spacer group having 1 to 20 C atoms,

X is —O—, —S—, —CO—, —COO—, —OCO—, —CO—NH—, —NH—CO—, —CH$_2$CH$_2$—, —OCH$_2$—, —CH$_2$O—, —SCH$_2$—, —CH$_2$S—, —CH=CH—, —CH=CH—COO—, —OCO—CH=CH—, —C≡C—, or a single bond, n is 0 or 1, Y$^1$ and Y$^2$ are each independently F, Cl, CN, NO$_2$, OCH$_3$, COR$^1$, COOR$^1$ or a fluorinated alkyl or alkoxy group having 1 to 4 C atoms, R$^1$ is an alkyl group with 1 to 3 C atoms, which is optionally fluorinated, r1, r2 and r3 are 0 or 1, with r1+r2+r3=1, and Z$^1$, Z$^2$ are each independently —COO— or —OCO—.

2. A monoreactive mesogenic compound of one of the following formulae

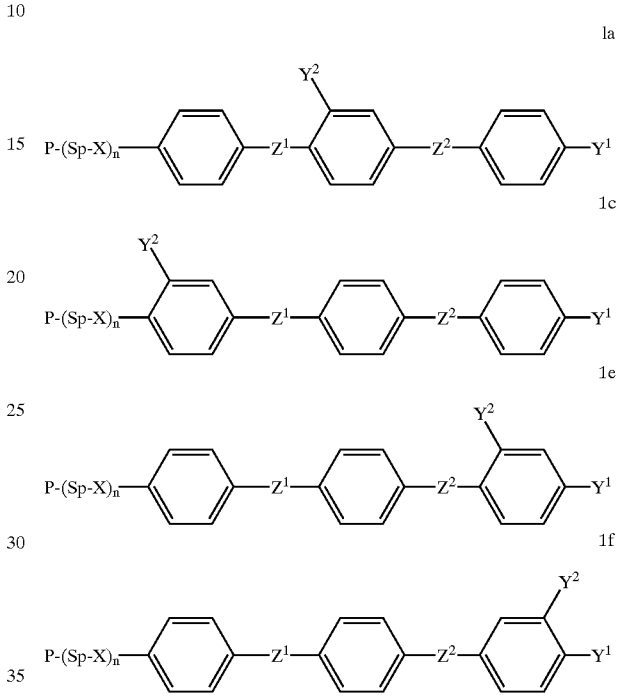

wherein
P is CH$_2$=CW—COO—, WCH=CH—O—,

or CH$_2$=CH-Phenyl-(O)$_k$— with W being H CH$_3$ or Cl and k being 0 or 1,

Sp is a spacer group having 1 to 20 C atoms

X is —O—, —S—, —CO—, —COO—, —OCO—, —CO—NH—, —NH—CO—, —CH$_2$CH$_2$—, —OCH$_2$—, —CH$_2$O—, —SCH$_2$—, —CH$_2$S—, —CH=CH—, —CH=CH—COO—, —OCO—CH=CH—, —C≡C—, or a single bond, n is 0 or 1, Y$^1$ and Y$^2$ are each independently F, Cl, CN, NO$_2$, OCH$_3$, COR$^1$, COOR$^1$ or a fluorinated alkyl or alkoxy group having 1 to 4 C atoms, and R$^1$ is an alkyl group with 1 to 3 C atoms, which is optionally fluorinated.

3. The monoreactive mesogenic compound according to claim 1, wherein n is 1 and Sp is alkylene with 1 to 15 C atoms.

4. The monoreactive mesogenic compound according to claim 1, wherein P is acryl, methacryl or epoxy.

5. The monoreactive mesogenic compound according to claim 1, wherein Y$^1$ and Y$^2$ are, independently, F, Cl, OCH$_3$, COCH$_3$, COC$_2$H$_5$, COOCH$_3$, COOC$_2$H$_5$, CF$_3$, OCF$_3$, OCHF$_2$ or OC$_2$F$_5$.

6. The monoreactive mesogenic compound according to claim 1, wherein X is —O—, —COO—, —OCO— or a single bond.

7. A polymerizable liquid crystal composition comprising at least two polymerizable components, at least one of which is a compound according to claim 1.

8. The composition according to claim 7, wherein the composition comprises at least one polymerizable mesogenic compound having two or more polymerizable terminal groups.

9. A linear or crosslinked polymer obtainable by polymerization of a compound according to claim 1.

10. An optical element for a polarizer, a compensator, an alignment layer, a color filter or a holographic element; a liquid crystal display; an adhesive; a synthetic resin with anisotropic mechanical properties; a cosmetic; a diagnostic or liquid crystal pigment; a decorative or security device; or a nonlinear optic or an optical information storage device comprising a compound according to claim 1.

11. A linear or crosslinked polymer obtainable by polymerization of a composition according to claim 9.

12. The monoreactive mesogenic compound according to claim 1 wherein P is an acrylate group, a methacrylate group, a vinyl group, a vinyloxy group, an epoxy group, a styrene group, or a propenyl ether group.

13. The monoreactive mesogenic compound according to claim 1, wherein Sp is an alkylene group having 1 to 12 C atoms where one or more non-adjacent $CH_2$ groups may be replaced by —O—, —S—, —NH—, —N($CH_3$)—, —CO—, —O—CO—, —S—CO—, —O—COO—, —CO—S—, —CO—O—, —CH(halogen)- or —CH(CN)—.

14. The polymerizable liquid crystal composition according to claim 7, further comprising at least one compound which is

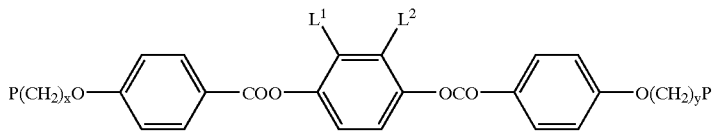

(V1)

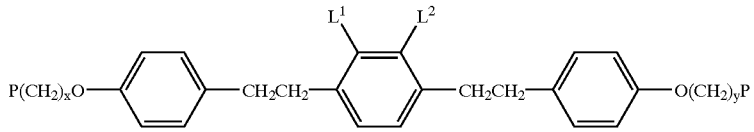

(V2)

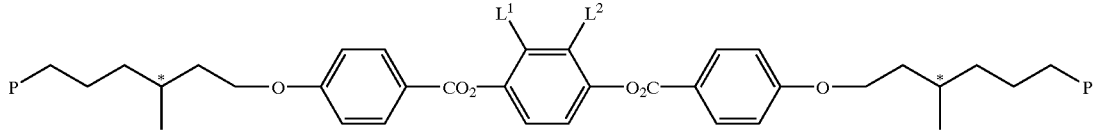

(V3)

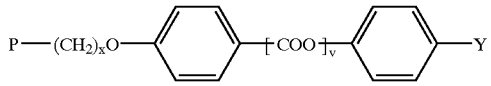

(V4)

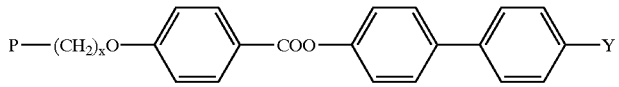

(V5)

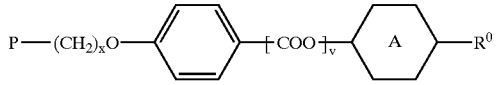

(V6)

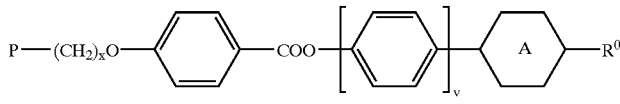

(V7)

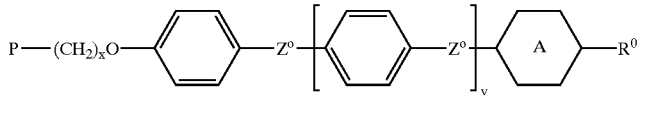

(V8)

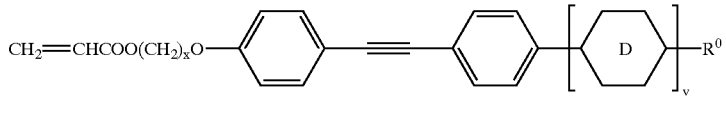

(V9)

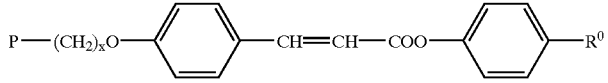

(V10)

P—(CH$_2$)$_x$O—⟨phenylene⟩—COO—⟨phenylene⟩—[⟨phenylene⟩]$_v$—CH$_2$C*H(CH$_3$)C$_2$H$_5$ (V11)

P—(CH$_2$)$_x$O—⟨phenylene⟩—COO—⟨phenylene with L$^1$⟩—COO—⟨phenylene⟩—CH$_2$C*H(CH$_3$)C$_2$H$_5$ (V12)

P—(CH$_2$)$_x$O—⟨phenylene⟩—COO-Ter (V13)

P—(CH$_2$)$_x$O—⟨phenylene⟩—COO-Chol (V14)

P—(CH$_2$)$_x$O—⟨phenylene⟩—COO—(terpenoid chain) (V15)

wherein P has one of the meanings given for formula I; x and y are each independently 1 to 12; the A ring is 1,4-phenylene or 1,4-cyclohexylene; v is 0 or 1; $Z^0$ is —COO—, —OCO—, —CH$_2$CH$_2$— or a single bond; Y is a polar group; $R^0$ is a non-polar alkyl or alkoxy group; Ter is a terpenoid radical; Chol is a cholesteryl group; and $L^1$ and $L^2$ are each independently H, F, Cl, CN or an optionally halogenated alkyl alkoxy or carbonyl or group with 1 to 7 C atoms.

15. The polymerizable liquid crystal composition according to claim 7, comprising at least two compounds of formula I.

16. The polymerzable liquid crystal composition according to claim 7, comprising 1 to 80 weight percent of one or more compounds of formula I.

17. The monoreactive mesogenic compound according to claim 1, wherein the spacer group Sp is a compound of the following formula:

$$—Q^1—\overset{*}{C}H—Q^4—$$
$$\quad\quad |$$
$$\quad\quad Q^3$$
II wherein
- $Q^1$ is an alkylene or alkylene-oxy group with 1 to 8 C atoms or a single bond,
- $Q^3$ is halogen, a cyano group or an alkyl or alkoxy group with 1 to 4 C atoms different from $Q^1$, and
- $Q^4$ is an alkylene or alkyleneoxy group with 1 to 7 C atoms or a single bond, being different from $Q^1$.

18. The polymerizable liquid crystal composition according to claim 7, wherein the composition comprises:

a1) 5 to 70% by weight of up to five monoreactive mesogenic compounds of formula I;

a2) 5 to 60% by weight of up to five monoreactive mesogenic compounds having a non-polar terminal alkyl or alkoxy group;

a3) 5 to 40% by weight of one, two or three monoreactive polymerizable mesogenic compounds having a polar terminal group;

b) 0 to 25% by weight of a direactive polymerizable mesogenic compound;

c) 0.5 to 10% by weight of a polymerization initiator; and d) 0 to 5% by weight of a surfactant.

19. The polymerizable liquid crystal composition according to claim 7, further comprising:

a catalyst, a stabilizer, a chain-transfer agent, a co-reacting monomer and/or a surface-active compound.

20. The polymerizable liquid crystal composition according to claim 7, further comprising:

non-ionic fluoroalkylalkoxylate surfactants of formula III or IV $$C_nF_{2n+1}SO_2N(C_2H_5)(CH_2CH_2O)_xCH_3 \quad\quad III$$

$$C_nF_{2n+1}(CH_2CH_2O)_xH \quad\quad IV$$

wherein n is an integer from 4 to 12 and x is an integer from 5 to 15.

* * * * *